US012467610B1

(12) United States Patent
Hsu

(10) Patent No.: US 12,467,610 B1
(45) Date of Patent: Nov. 11, 2025

(54) ANTI-TIPPING GROUND SPIKE FIXTURE

(71) Applicant: DONGGUAN JIASHENG LIGHTING TECHNOLOGY CO., LTD., Guangdong (CN)

(72) Inventor: Chih-Pin Hsu, Guangdong (CN)

( * ) Notice: Subject to any disclaimer, the term of this patent is extended or adjusted under 35 U.S.C. 154(b) by 0 days.

(21) Appl. No.: 19/016,100

(22) Filed: Jan. 10, 2025

(30) Foreign Application Priority Data

Dec. 13, 2024 (CN) ......................... 202423095703.5

(51) Int. Cl.
*F21V 21/08* (2006.01)

(52) U.S. Cl.
CPC ................................ *F21V 21/0824* (2013.01)

(58) Field of Classification Search
CPC ..... F21V 21/0824; E04H 12/2215; A45F 3/44
See application file for complete search history.

(56) References Cited

U.S. PATENT DOCUMENTS 4,004,383 A * 1/1977 Watanabe ........... E04H 12/2215 52/165
4,659,049 A * 4/1987 Watson .............. A47G 23/0225 248/346.11
8,096,368 B1 * 1/2012 Rider .................... E04H 17/263 173/90
8,978,676 B2 * 3/2015 Williams ................ E04H 12/22 248/156
10,168,010 B1 * 1/2019 Hsu ......................... F21S 6/005
10,619,810 B1 * 4/2020 Hwang ................... F21S 9/037
12,152,755 B1 * 11/2024 Hwang ..................... F21S 9/03

FOREIGN PATENT DOCUMENTS

GB 2630941 A * 12/2024 ............ F21V 31/005

* cited by examiner

*Primary Examiner* — Zheng Song
(74) *Attorney, Agent, or Firm* — Nicholas Makridakis

(57) ABSTRACT

Disclosed is an anti-tipping ground spike fixture, including a light fixture installation end and a fixing disc; the fixing disc includes a plurality of limiting through holes formed at different positions on the fixing disc; the light fixture installation end can pass through different limiting through holes and is snap-fitted on the fixing disc to adjust a center of gravity of the ground spike fixture. The center of gravity of the ground spike light fixture can be adjusted by adjusting a position of connection between the light fixture installation end and the fixing disc, such that the present disclosure can be applied to an off-center ground spike light fixture, the stability of the entire ground spike light fixture is enhanced, and a risk of tipping of the light body is reduced. The present disclosure can be adapted to different installation environments by introducing an outer disc.

10 Claims, 8 Drawing Sheets

ANTI-TIPPING GROUND SPIKE FIXTURE

TECHNICAL FIELD

The present disclosure relates to the technical field of ground spike light fixtures, and particularly relates to an anti-tipping ground spike fixture.

BACKGROUND

Existing ground spike light fixtures are often designed to be off-center for visual aesthetics, but existing ground spike structures are insufficient to support the off-center ground spike light fixtures, resulting in an unstable center of gravity of an overall structure of the light fixtures, and posing a great risk of tipping over.

Therefore, the prior art needs to be further improved and developed.

SUMMARY

In view of the deficiencies in the prior art, the present disclosure provides an anti-tipping ground spike fixture, so as to solve the problem that the existing ground spike fixture has an unstable center of gravity and is easy to tip over.

The present disclosure is implemented through the following technical solution:

- A first aspect of the present disclosure is to provide an anti-tipping ground spike fixture, including a light fixture installation end and a fixing disc;
- the fixing disc includes a plurality of limiting through holes, and the limiting through holes are formed at different positions on the fixing disc; and
- the light fixture installation end passes through the limiting through holes and is snap-fitted on the fixing disc, and the light fixture installation end can pass through different limiting through holes and is snap-fitted on the fixing disc to adjust a center of gravity of the ground spike fixture.

Specifically, a plurality of the limiting through holes are distributed in any direction from a center of the fixing disc to an edge of the fixing disc.

Specifically, the fixing disc includes an outer disc and an inner disc that are detachably connected, the outer disc is arranged around the inner disc, and the outer disc is detachably connected to the inner disc through an easy-to-fold structure, such that the outer disc can be removed as needed.

Specifically, the easy-to-fold structure is a hollow connecting segment, and a plurality of the easy-to-fold structures are symmetrically and evenly spaced around an inner edge of the outer disc.

Specifically, the light fixture installation end includes a light connection end, a fixing end, and a ground spike connected in sequence in an axial direction, and the fixing end is detachably connected to the ground spike.

Specifically, the ground spike includes an adapter with an inverted "T"-shaped cross section, the adapter includes a limiting disc and a hollow column that extends vertically outward from a center of the limiting disc, a limiting snap-fit slot and an outer convex thread are formed on the column to be connected to the fixing end; and a plurality of limiting protrusions are arranged on a surface of the limiting disc facing the fixing end for being snap-fitted on the fixing disc to assist in positioning.

The fixing end has a hollow structure, an inner side wall thereof includes an inner thread, and the outer convex thread matches a shape of the inner thread to facilitate a detachable connection between the fixing end and the ground spike.

The ground spike further includes a ground spike convex edge, one end of the ground spike convex edge is fixed on one side of the ground spike that is away from the fixing end, and the other end thereof is tapered to form a pointed pyramidal structure that is easy to be inserted into a ground, such that a use scenario of the ground spike fixture being installed on a muddy ground can be achieved.

Specifically, the fixing disc further includes a plurality of auxiliary fixing holes, the auxiliary fixing holes are set in different shapes to be adapted to different types of ground stakes, so as to enhance the stability of the ground spike fixture when being installed; and a plurality of limiting grooves are formed on a periphery of the limiting through hole of the fixing disc facing the ground spike fixture, and the limiting grooves are adapted to the limiting protrusions, such that auxiliary positioning during installation can be realized.

Specifically, the ground spike fixture further includes linear ground stakes and concave ground stakes, the linear ground stakes and the concave ground stakes are configured to pass through the auxiliary fixing holes to fix the fixing disc at an installation position, thereby enhancing the stability.

Compared with the prior art, the present disclosure has the following beneficial effects: the present disclosure provides an anti-tipping ground spike fixture, including a light fixture installation end and a fixing disc; the fixing disc includes a plurality of limiting through holes, and the limiting through holes are formed at different positions on the fixing disc; the light fixture installation end passes through the limiting through holes and is snap-fitted on the fixing disc, and the light fixture installation end can pass through different limiting through holes and is snap-fitted on the fixing disc to adjust a center of gravity of the ground spike fixture. A center of gravity of the ground spike light fixture can be adjusted by adjusting a position of connection between the light fixture installation end and the fixing disc, so as to adapt to an off-center ground spike light fixture, such that the stability of the entire ground spike light fixture is enhanced, and a risk of tipping of the light body is reduced. Moreover, the ground spike fixture can be adapted to different installation environments by introducing the outer disc.

BRIEF DESCRIPTION OF THE DRAWINGS

In order to more clearly illustrate technical solutions in the embodiments of the present disclosure or in the prior art, a brief introduction to the accompanying drawings required for the description of the embodiments or the prior art will be provided below. Obviously, the accompanying drawings in the following description are only some of the embodiments of the present disclosure, and those ordinary skill in the art would also be able to derive other drawings from these drawings without making creative efforts.

1—light fixture installation end; 11—light connection end; 12—fixing end; 13—ground spike; 131—adapter; 1311—outer convex thread; 1312—limiting snap-fit slot; 1313—limiting disc; 1314. limiting protrusion; 132—ground spike convex edge; 2—fixing disc; 21—outer disc; 22—inner disc; 23—limiting through hole; 24—auxiliary fixing hole; 25—easy-to-fold structure; 26—decorative hole; 27—limiting groove; 3—linear ground stake; 4—concave ground stake; 5—light body; and 6—screw.

DETAILED DESCRIPTIONS OF THE EMBODIMENTS

The technical solutions in the embodiments of the present disclosure are described below clearly and comprehensively in conjunction with the embodiments of the present disclosure. It is obvious that the implementation described are merely a part of, not all of, embodiments of the present disclosure. On the basis of the embodiments of the present disclosure, all other embodiments obtained by those of ordinary skill in the art without making creative efforts shall fall within the scope of protection of the present disclosure.

It should also be understood that the terms used in the specification of the embodiments of the present disclosure are for the purpose of describing specific embodiments and are not intended to limit the present disclosure. As used in the specification of the present disclosure and the appended claims, the singular forms "a," an," and "the" are intended to include the plural forms, unless the context clearly indicates otherwise.

Many specific details are set forth in the following description for sufficient understanding of the present disclosure. However, the present disclosure may also be implemented in other manners different from that described herein. Similar popularizations may be made by persons skilled in the art without violating the connotations of the present disclosure. Therefore, the present disclosure is not limited by the specific embodiments disclosed below.

Figure 1:
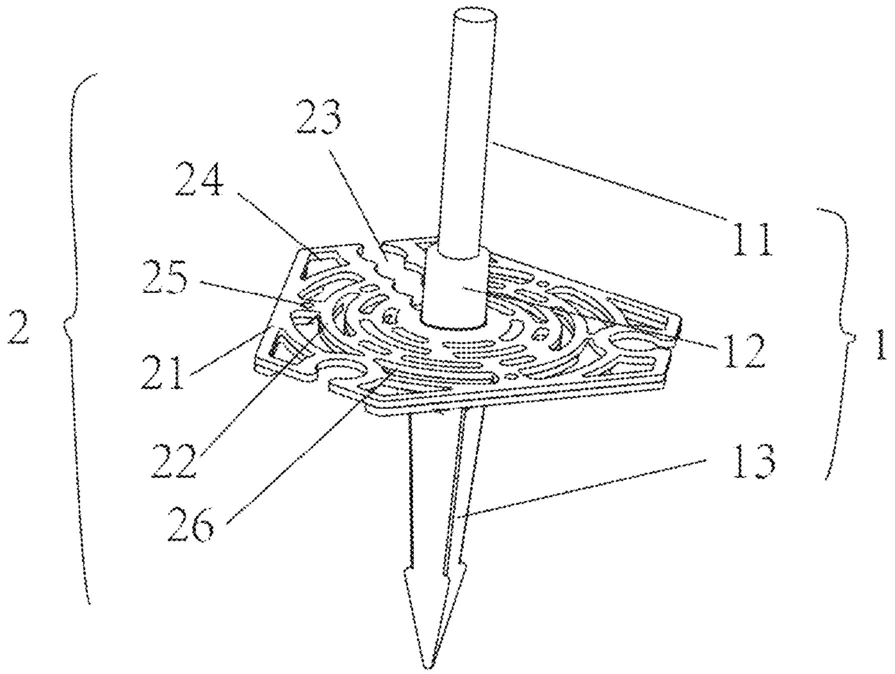
FIG. 1 is a structural schematic diagram of an anti-tipping ground spike fixture according to one embodiment of the present disclosure.

As shown in FIG. 1, a first aspect of the present disclosure is to provide an anti-tipping ground spike fixture, including a light fixture installation end 1 and a fixing disc 2; the light fixture installation end 1 passes through one limiting through hole 23 of the fixing disc 2 and is snapped together to form the ground spike fixture; in other words, the light fixture installation end 1 passes through the limiting through hole 23 and is snap-fitted on the fixing disc 2, and the light fixture installation end 1 can pass through different limiting through holes 23 and is snap-fitted on the fixing disc 2 to adjust a center of gravity of the ground spike fixture.

As shown in FIG. 1, a plurality of the limiting through holes 23 are distributed in any direction from a center of the fixing disc 2 to an edge thereof, such that the center of gravity of the ground spike fixture is adjustable; an outermost limiting through hole 23 extends the edge of the fixing disc 2, such that the edge of the fixing disc 2 forms an opening to facilitate the adjustment of the center of gravity of the ground spike fixture and a light body during use; and the fixing disc 2 can be circular, centrally symmetric, or axially symmetric in structure. The limiting through holes 23 can also be arranged at the edge of the fixing disc.

Figure 4:
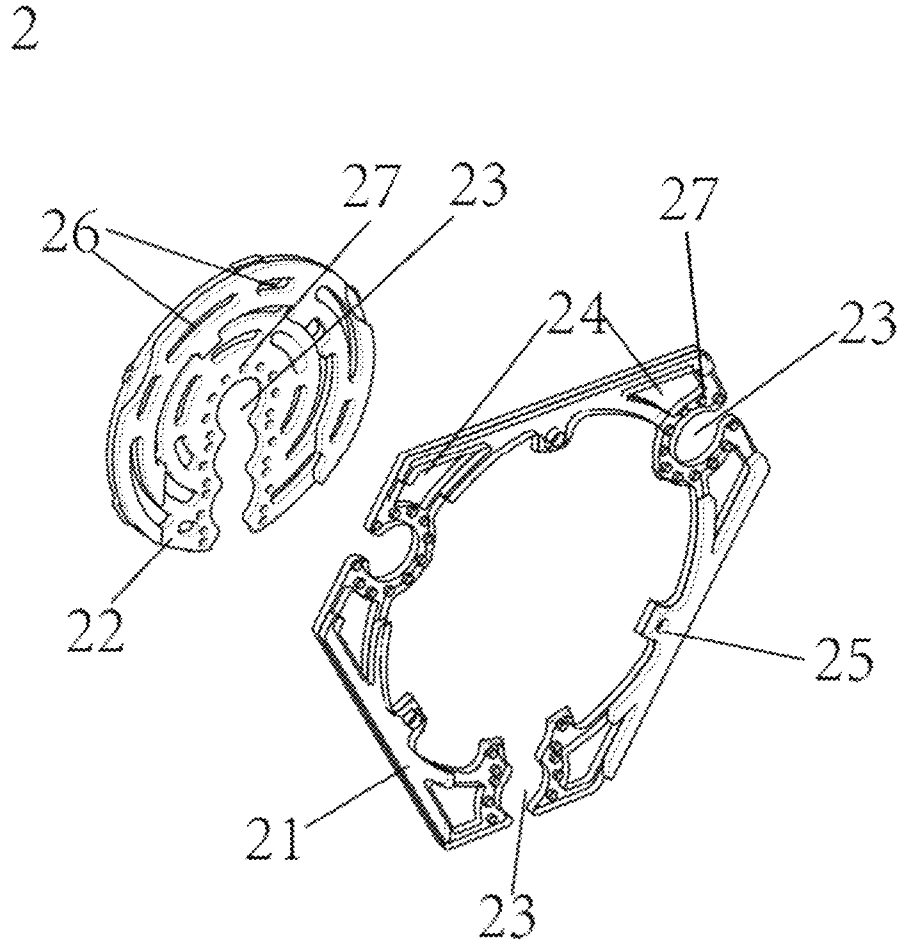
FIG. 4 is a schematic diagram of a partial disassembly structure of a fixing disc according to one embodiment of the present disclosure.

As shown in FIG. 1 or 4, the fixing disc 2 includes an outer disc 21 and an inner disc 22 that are detachably connected, the outer disc 21 is arranged around the inner disc 22, and the outer disc 21 is detachably connected to the inner disc 22 through an easy-to-fold structure 25, such that the outer disc 21 can be removed as needed. Removing the outer disc 21 can adapt to an installation environment having a smaller area.

As shown in FIG. 1 or 4, the easy-to-fold structure 25 is a hollow connecting segment, and a plurality of the easy-to-fold structures 25 are symmetrically and evenly spaced around an inner edge of the outer disc 21. The evenly spaced easy-to-fold structures 25 can make force of connection with the inner disc 22 is balanced, which is conducive to an overall stability of the fixing disc during use. When the outer disc needs to be removed, the hollow connecting segment can make the easy-to-fold structure 25 to be easily removed, which ensures not only the balance of force during connection, but also the convenience and effortlessness during disassembly.

As shown in FIG. 1, the light fixture installation end 1 includes a light connection end 11, a fixing end 12, and a ground spike 13 connected in sequence in an axial direction, the fixing disc 2 is snapped between the fixing end 12 and the ground spike 13, and the fixing end 12 is detachably connected to the ground spike 13.

Figure 2:
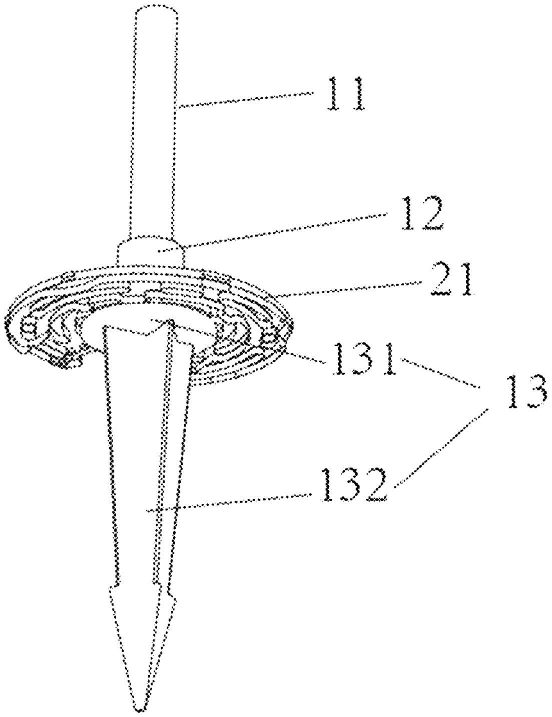
FIG. 2 is a structural schematic diagram of an anti-tipping ground spike fixture according to another embodiment of the present disclosure.
Figure 3:
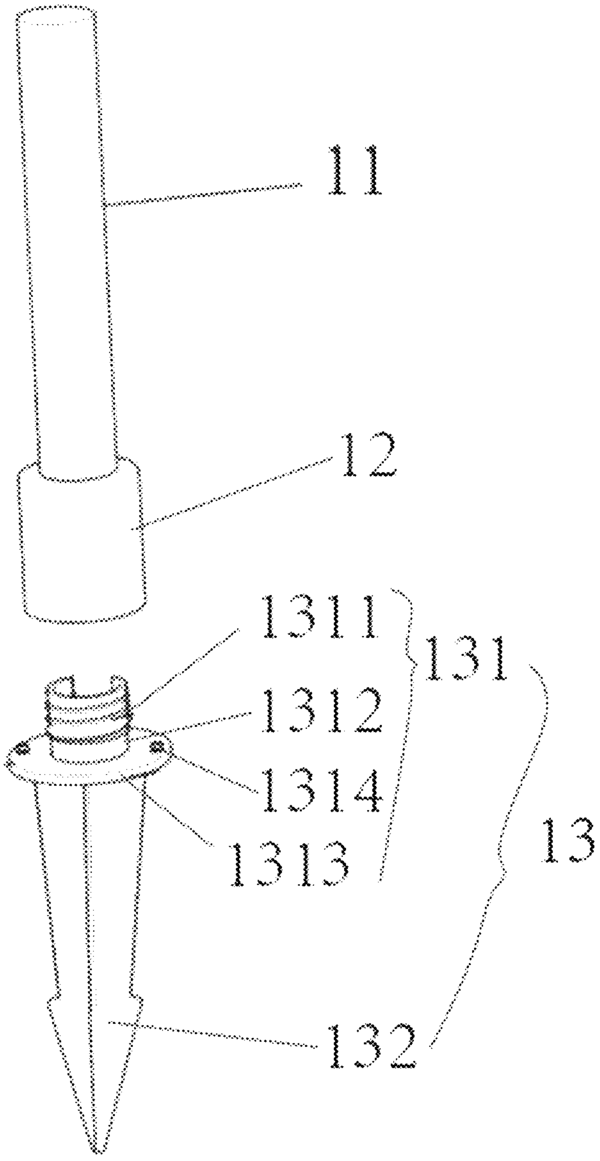
FIG. 3 is a schematic diagram of a partial disassembly structure of a light fixture installation end according to one embodiment of the present disclosure.

As shown in FIG. 2, the ground spike 13 includes an adapter 131 with an inverted "T"-shaped cross section and a ground spike convex edge 132. As shown in FIG. 3, the adapter 131 includes a limiting disc 1313 and a hollow column that extends vertically outward from a center of the limiting disc 1313, a limiting snap-fit slot 1312 and an outer convex thread 1311 are formed on a periphery of the column, and the column is detachably connected to the fixing end 12 via the outer convex thread 1311; and a plurality of limiting protrusions 1314 are arranged on a surface of the limiting disc 1313 facing the fixing end 12 for being snap-fitted on the fixing disc 2 to assist in positioning.

A size of the limiting disc 1313 is larger than that of the limiting through hole 23, such that the fixing disc can be snapped into the limiting disc. When in use, the limiting through hole of the fixing disc is snapped into the limiting snap-fit slot 1312, the column is exposed from the limiting through hole 23, such that the outer convex thread on a surface of the column is exposed and is connected to an inner thread on an inner wall of the fixing end, thereby realizing a connection of the ground spike fixture.

Figure 5:
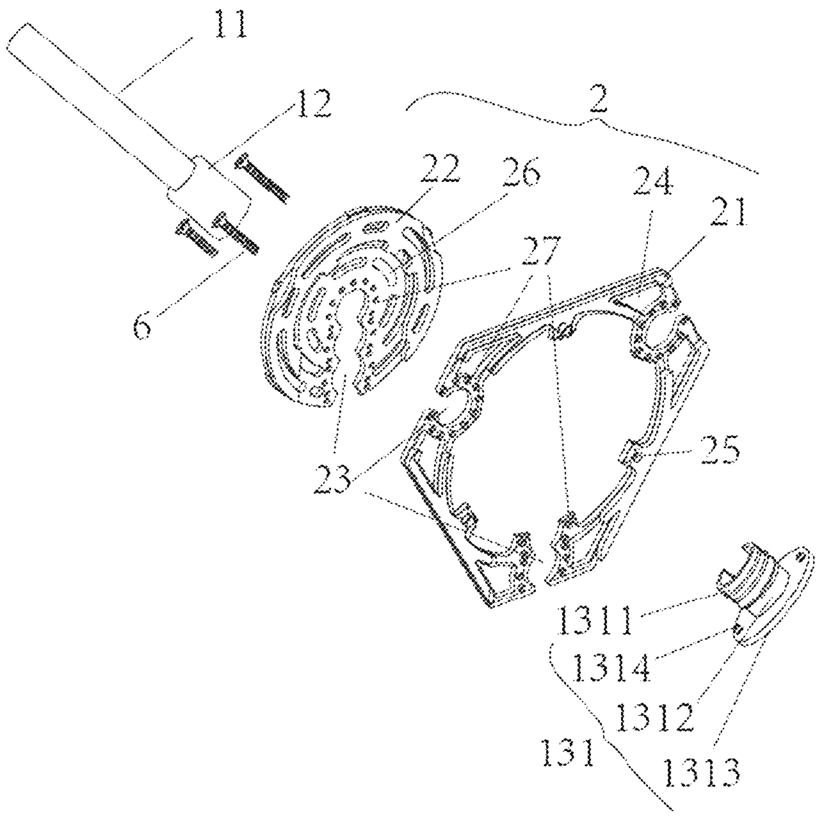
FIG. 5 is a schematic diagram of a disassembly structure of an anti-tipping ground spike fixture according to another embodiment of the present disclosure.

Specifically, as shown in FIG. 5, during installation, the adapter 131 is first passed through the limiting through hole 23 in a required direction, and the limiting protrusion 1314 is snapped into a limiting recess 27 of the fixing disc 2, such that the fixing disc 2 is snap-fitted on the limiting disc 1313 (as shown in FIG. 3); and the outer convex thread 1311 is then connected to and fixed with the inner thread of the fixing end 12, and a screw 6 passes through an auxiliary fixing hole 24 or a decorative hole 26 and is installed on a base surface to complete the installation of the ground spike fixture. When the ground spike 13 only includes the adapter 131, the ground spike can be adapted to various use scenarios such as lawn, soil, cement, wooden board, and wall.

As shown in FIG. 3, optionally, when an installation base surface is soft and the adapter 131 is insufficient for stable installation, an additional ground spike convex edge 132 capable of being inserted into a deeper position of the base surface can be arranged on the ground spike 13. Specifically, the ground spike convex edge 132 is arranged on the other side of the adapter 131 away from the fixing end 12 and extends outward. One end of the ground spike convex edge 132 is fixed to one side of the limiting disc 1313 that is away from the fixing end 12, and the other end thereof is tapered to form a pointed pyramidal structure that is easy to be inserted into a ground that is easy to be inserted into a ground, such that the ground spike fixture can be stably fixed despite that the installation base surface is relatively soft, such as a muddy ground, thereby making the center of gravity of the ground spike light fixture more stable.

Specifically, the limiting disc 1313 can be a circular disk-shaped structure, with a size referring to a diameter of the circular disk, or can be a square or a rectangular disk-shaped structure, with a size referring to a side length thereof. All sizes can be designed according to actual needs. Specifically, the size of the limiting disc 1313 is larger than that of the limiting through hole 23, such that the fixing disc 2 can be snap-fitted on the limiting disc 1313. The comparison of sizes involved herein refers to diameters of various structures. For example, when the limiting disc is the circular disk-shaped structure, a diameter thereof is R1, a diameter of a cross section of the cylindrical fixing end 12 is R2, a diameter of the cylindrical adapter 131 is R3, a diameter of the limiting through hole 23 is R4, and it is set that R1>R2>R4>R3, such that the adapter 131 can pass through the limiting through hole 23 and is connected to the fixing end 12 via the limiting through hole 23, and the light fixture installation end 1 is snap-fitted on the fixing disc 2. Preferably, as shown in FIG. 1, the light connection end 11 and fixing end 12 are both cylindrical, and the limiting through hole 23 is also circular. Optionally, the light connection end 11 and the fixing end 12 can be square, and the limiting through hole 23 can also be square.

As shown in FIG. 2, the limiting disc 1313 is connected to the fixing end 12, and the ground spike convex edge 132 is away from the fixing end 12. The limiting disc 1313 and fixing end 12 can either be integrally formed or be connected in a detachable manner. When being installed, the light connection end 11 and the fixing end 12 of the integrally formed light fixture installation end can only be first passed through the limiting through hole 23 from below the fixing disc 2, and the ground spike 13 is then installed at a specified position, in which case, a cross-sectional structure of the fixing end 12 is adapted to a shape of the limiting through hole 23, a size of a cross-sectional structure of the light connection end 11 is smaller than or equal to the size of the limiting through hole 23, the light connection end 11 and the fixing end 12 pass through the limiting through hole 23, and the fixing disc 2 is snap-fitted on the limiting disc 1313 near the fixing end 12 of the ground spike 13, the disadvantage of the design is that it is inconvenient to replace a light body, and an entire ground spike fixture must be removed for replacement, which is time-consuming and labor-intensive. Therefore, the present disclosure further provides a light fixture installation end 1 with a detachable structure. The light fixture installation end 1 with a detachable structure can improve flexibility of a product and facilitate replacement and installation of the light body during use.

FIG. 3 is a schematic diagram of a partial disassembly structure of a light fixture installation end 1 with a detachable structure, the outer convex thread 1311 is formed on one side of the limiting disc 1313 facing the fixing end, the fixing end 12 has a hollow structure, an inner side wall thereof includes an inner thread (not shown in the figure), and the outer convex thread 1311 matches a shape of the inner thread, such that the fixing end 12 and the limiting disc 1313 can be detachably connected. When being installed, the ground spike 13 of the light fixture installation end is first fixed, the fixing disc 2 is then placed, the limiting through hole 23 is then passed through the outer convex thread 1311 to facilitate the installation and placement, and the fixing end 12 and the light connection end 11 are installed, which has the advantage of easy replacement of the light body after installation, it only needs to detach the outer convex thread 1311 from the inner thread, and the light body can be replaced without changing the position of the ground spike 13. In order to prevent the outer convex thread 1311 from affecting the position of the fixing disc, the limiting snap-fit slot 1312 is arranged at a position of the outer convex thread near the fixing disc, and a height of the limiting snap-fit slot 1312 (that is, a height in an extension direction of the light fixture installation end 1) is adapted to a thickness of the fixing disc 2.

The anti-tipping feature of the ground spike light fixture in the present disclosure requires not only the snap-fitting connection between the light fixture installation end 1 and the fixing disc 2, but also an expansion area of the fixing disc 2 perpendicular to the light fixture installation end 1. The fixing disc 2 is a sheet-like structure as a whole, and can be adapted to different installation scenarios through the detachable outer disc 21 and the inner disc 22, thereby improving compatibility.

In another embodiment, an outer disc 21 and an inner disc 22 of the fixing disc 2 are detachably connected through an easy-to-fold structure 25, and a plurality of the easy-to-fold structures are arranged and evenly spaced around an inner edge of the outer disc. When the easy-to-fold structure 25 is disassembled, the outer disc is accordingly detached from the inner disc separate. FIG. 1 is a structural schematic diagram of the ground spike fixture that the outer disc 21 and the inner disc 22 is in a connection state, and FIG. 2 is a structural schematic diagram of the ground spike fixture with which only the inner disc 22 is provided. FIG. 4 is a schematic diagram of a disassembly structure of the fixing disc 2.

As shown in FIG. 4, the fixing disc 2 in the present disclosure includes the outer disc 21 and the inner disc 22, which are detachably connected through the easy-to-fold structure 25, the fixing disc further includes a limiting through hole 23, an auxiliary fixing hole 24, and a decorative hole 26. The plurality of the easy-to-fold structures 25 are arranged and evenly spaced around an inner edge of the outer disc 21, and a number of the easy-to-fold structures is determined according to actual needs.

Specifically, a plurality of the limiting through holes 23 are distributed in any direction from a center of the fixing disc 2 to an edge thereof, such that the center of gravity of the ground spike fixture is adjustable. As shown in FIG. 4, the limiting through holes 23 are arranged both on the outer disc 21 and the inner disc 22, and separate limiting through holes 23 are arranged on the outer disc 21 to form a centrally symmetrical structure, such that the ground spike fixture has a wide adjustable range and is adapted to different use scenarios.

It can be understood that the limiting through hole 23 can be arranged at any position of the fixing disc 2, the plurality of the limiting through holes 23 can be arranged in sequence or distributed independently, and arrangement in sequence allows for more precise adjustment of the center of gravity.

Figure 6:
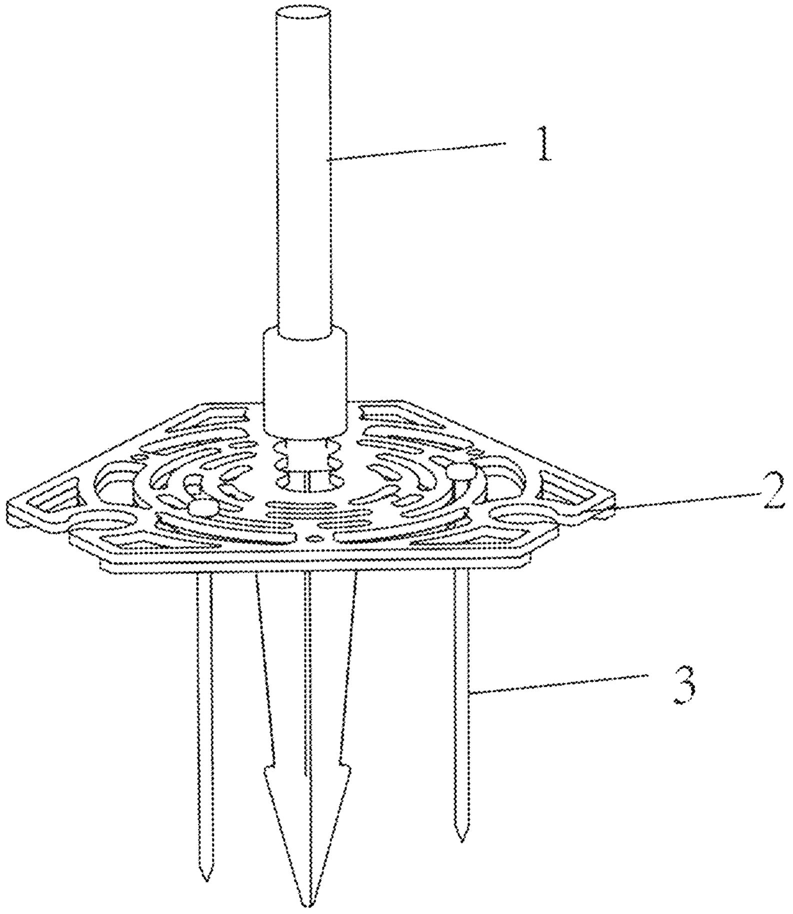
FIG. 6 is a structural schematic diagram of an anti-tipping ground spike fixture fixed with a linear ground stake according to an embodiment of the present disclosure.
Figure 7:
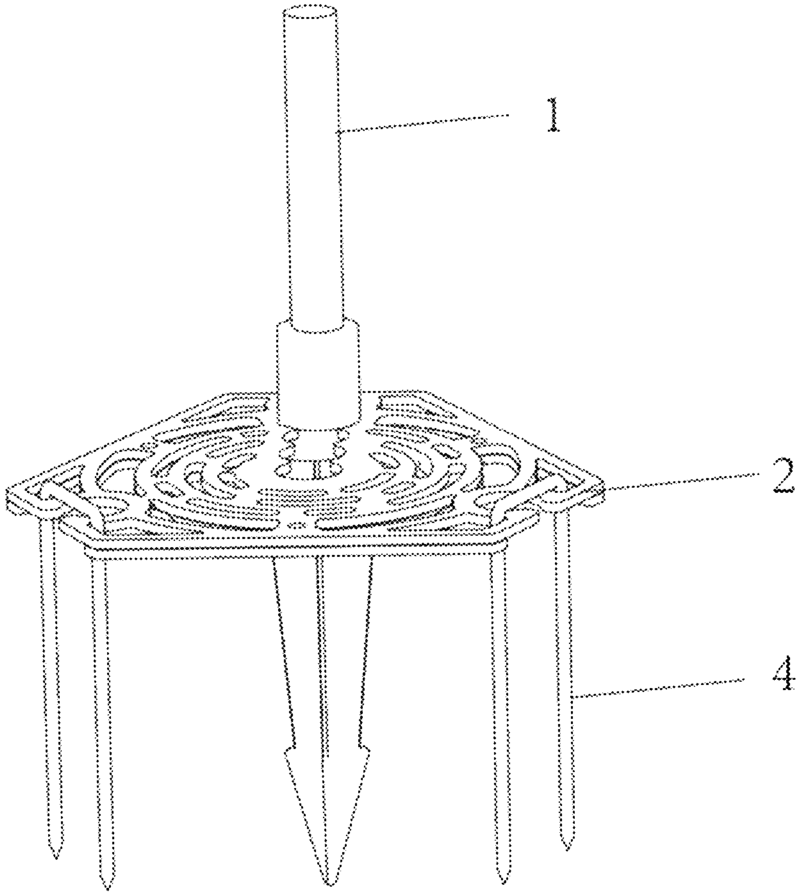
FIG. 7 is a structural schematic diagram of an anti-tipping ground spike fixture fixed with a concave ground stake according to an embodiment of the present disclosure.

Specifically, the fixing disc 2 further includes a plurality of the auxiliary fixing holes 24, which can be circular, rectangular, or trapezoidal in shape to be adapted to different types of ground stakes, so as to enhance the stability of the ground spike fixture when being installed. For example, as shown in FIG. 4, a plurality of circular auxiliary fixing holes 24 are formed around a periphery of the circular limiting through holes 23, and can also be adapted to linear ground stakes 3, as shown in FIG. 6. A plurality of sets of trapezoidal auxiliary fixing holes 24 are formed on a position of the outer disc 21 near an outer edge, and can also be adapted to concave ground stakes 4, as shown in FIG. 7, any set of trapezoidal auxiliary fixing holes 24 are symmetrically arranged, and different side lengths can be adapted to different sizes of concave ground stakes 4. By passing the ground stakes in different shapes through the auxiliary fixing holes 24, the stability of the ground spike fixture can be further enhanced.

Specifically, as shown in FIG. 5, a plurality of limiting grooves 27 are formed on a periphery of the limiting through hole 23 of the fixing disc 2 facing the ground spike fixture, and the limiting grooves 27 are adapted to the limiting protrusions 1314, such that auxiliary positioning during installation can be realized. Preferably, a plurality of the limiting protrusions 1314 are arranged and evenly spaced on the limiting disc 1313, the plurality of the limiting grooves 27 are also arranged and evenly spaced on the fixing disc, and a number of the limiting grooves 27 is greater than a number of the limiting protrusions 1314, and shapes of the limiting grooves 27 are adapted to shapes of the limiting protrusions 1314, and can be circular, square, or other shapes. Optionally, the limiting grooves 27 can also be set as through holes to pass through the surface of the fixing disc, thereby facilitate accurate positioning during installation.

As shown in FIG. 4, the fixing disc in the present disclosure further includes a decorative hole 26, a plurality of elongated decorative holes 26 are formed on the circular inner disc 22 at positions avoiding the limiting through holes 23 and the auxiliary fixing holes 24, which cannot only avoid locations of the installation base surface where screws cannot penetrate through, but also improve overall aesthetics of the fixture. Moreover, for an outdoor installation environment, the decorative holes 26 allows underground plants to pass through, which cannot only improve the stability of the fixture with the help of plant roots for additional grip, but also reduce the damage to the fixture caused by tipping due to unstable center of gravity, thereby prolonging a service life of the fixture. Optionally, the decorative holes 26 can also serve as auxiliary positioning holes to assist in fixation.

It can be understood that the outer disc 21 and the inner disc 22 of the fixing disc 2 can be circular, square, irregular, and other different shapes.

Further, the ground spike fixture provided by the present disclosure further includes the linear ground stakes 3 and the concave ground stakes 4, which are configured to pass through the auxiliary fixing holes 24 to further enhance the stability of the ground spike fixture in the present disclosure. An irregular design of the irregular auxiliary fixing holes 24 can be adapted to the concave ground stakes 4 of different size, thereby improving the compatibility.

Specifically, in order to enhance stability and durability, the fixing disc and the light fixture installation end of the present disclosure is made from high-strength alloy material such as iron alloy or copper alloy.

Figure 8:
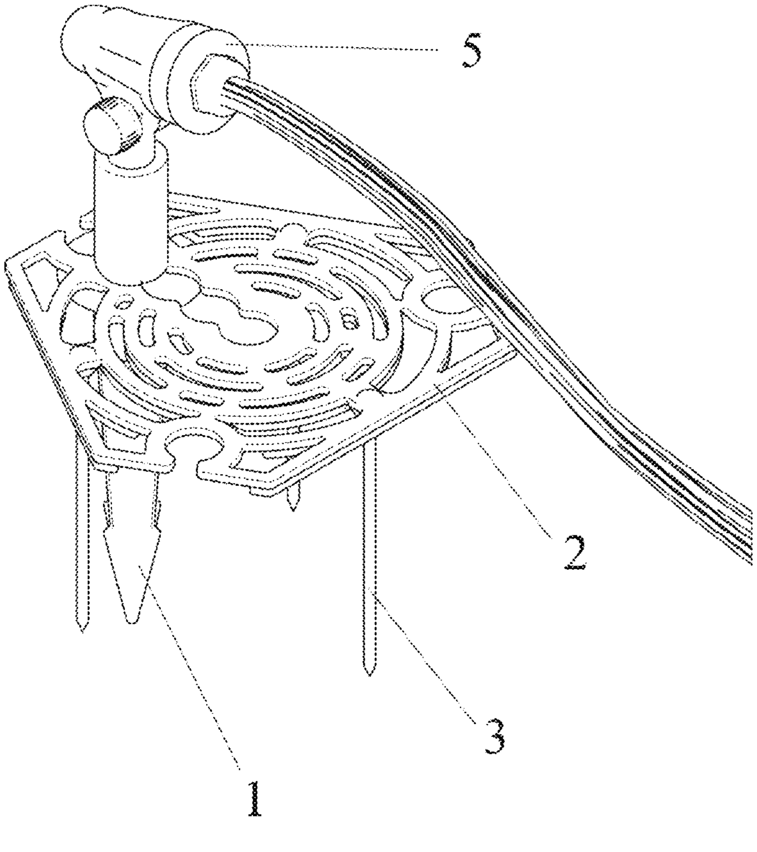
FIG. 8 is a structural schematic diagram of a ground spike light fixture according to an embodiment of the present disclosure.

A second aspect of the present disclosure provides a ground spike light fixture, as shown in FIG. 8, the ground spike light fixture includes a light body 5 and the anti-tipping ground spike fixture as described above. After being connected to the light connection end of the light fixture installation end 1, the light body 5 is inserted into a ground through the light fixture installation end 1, and is fixed through the fixing disc 2 and the linear ground stakes 3. A center of gravity of the ground spike light fixture in the present disclosure can be adjusted by adjusting a position of connection between the light fixture installation end 1 and the fixing disc 2, so as to adapt to the light body 5 with an eccentric center of gravity, such that the stability of the entire ground spike light fixture is enhanced, and a risk of tipping of the light body 5 is reduced.

In summary, the present disclosure provides an anti-tipping ground spike fixture, including a light fixture installation end and a fixing disc; the fixing disc includes a plurality of limiting through holes, and the limiting through holes are formed at different positions on the fixing disc; the light fixture installation end passes through the limiting through holes and is snap-fitted on the fixing disc, and the light fixture installation end can pass through different limiting through holes and is snap-fitted on the fixing disc to adjust a center of gravity of the ground spike fixture. A center of gravity of the ground spike light fixture can be adjusted by adjusting a position of connection between the light fixture installation end and the fixing disc, so as to adapt to an off-center ground spike light fixture, such that the stability of the entire ground spike light fixture is enhanced, and a risk of tipping of the light body is reduced. Moreover, the ground spike fixture can be adapted to different installation environments by introducing the outer disc or not.

In summary, the above embodiments are merely intended for describing the technical solution of the present disclosure rather than limiting the present disclosure. Although the present disclosure is described in detail with reference to the above embodiments, those of ordinary skill in the art should understand that they can still make modifications to the technical solution described in the embodiments or equivalent substitutions to some technical features of the technical solution. These modifications or substitutions do not enable the corresponding technical solution to depart from the spirit and scope of the technical solutions in all the embodiments of the present disclosure, and should fall within the scope of protection of the present disclosure.

What is claimed is:

1. An anti-tipping ground spike fixture, comprising a light fixture installation end and a fixing disc;

the fixing disc comprises a plurality of limiting through holes, and the limiting through holes are formed at different positions on the fixing disc; and the light fixture installation end passes through the limiting through holes and is snap-fitted on the fixing disc, and the light fixture installation end can pass through different limiting through holes and is snap-fitted on the fixing disc to adjust a center of gravity of the ground spike fixture.

2. The anti-tipping ground spike fixture according to claim 1, wherein a plurality of the limiting through holes are distributed in any direction from a center of the fixing disc to an edge of the fixing disc.

3. The anti-tipping ground spike fixture according to claim 1, wherein the fixing disc comprises an outer disc and an inner disc that are detachably connected, the outer disc is arranged around the inner disc, and the outer disc is detachably connected to the inner disc through an easy-to-fold structure, such that the outer disc can be removed as needed.

4. The anti-tipping ground spike fixture according to claim 3, wherein the easy-to-fold structure is a hollow connecting segment, and a plurality of the easy-to-fold structures are symmetrically and evenly spaced around an inner edge of the outer disc.

5. The anti-tipping ground spike fixture according to claim 1, wherein the light fixture installation end comprises a light connection end, a fixing end, and a ground spike connected in sequence in an axial direction, and the fixing end is detachably connected to the ground spike.

6. The anti-tipping ground spike fixture according to claim 5, wherein the ground spike comprises an adapter with an inverted "T"-shaped cross section, the adapter comprises a limiting disc and a hollow column that extends vertically outward from a center of the limiting disc, a limiting snap-fit slot and an outer convex thread are formed on the column to be connected to the fixing end; and a plurality of limiting protrusions are arranged on a surface of the limiting disc facing the fixing end for being snap-fitted on the fixing disc to assist in positioning.

7. The anti-tipping ground spike fixture according to claim 6, wherein the fixing end has a hollow structure, an inner side wall thereof comprises an inner thread, and the outer convex thread matches a shape of the inner thread to facilitate a detachable connection between the fixing end and the ground spike.

8. The anti-tipping ground spike fixture according to claim 6, wherein the ground spike further comprises a ground spike convex edge, one end of the ground spike convex edge is fixed on one side of the ground spike that is away from the fixing end, and the other end thereof is tapered to form a pointed pyramidal structure that is easy to be inserted into a ground, such that a use scenario of the ground spike fixture being installed on a muddy ground can be achieved.

9. The anti-tipping ground spike fixture according to claim 6, wherein the fixing disc further comprises a plurality of auxiliary fixing holes, the auxiliary fixing holes are set in different shapes to be adapted to different types of ground stakes, so as to enhance the stability of the ground spike fixture when being installed; and a plurality of limiting grooves are formed on a periphery of the limiting through hole of the fixing disc facing the ground spike fixture, and the limiting grooves are adapted to the limiting protrusions, such that auxiliary positioning during installation can be realized.

10. The anti-tipping ground spike fixture according to claim 9, wherein the ground spike fixture further comprises linear ground stakes and concave ground stakes, the linear ground stakes and the concave ground stakes are configured to pass through the auxiliary fixing holes to fix the fixing disc at an installation position, thereby enhancing the stability.

* * * * *